(12) United States Patent
Flanhardt et al.

(10) Patent No.: US 11,856,894 B2
(45) Date of Patent: Jan. 2, 2024

(54) TWINE KNOTTER AND METHOD OF FORMING A KNOT IN A TWINE

(71) Applicant: Rasspe Systemtechnik GmbH, Wermelskirchen (DE)

(72) Inventors: Michael Flanhardt, Langenfeld (DE); Heinrich Günter Schumacher, Eichelhardt (DE); Hans-Robert Lüttich, Dohna (DE); Christian Steglich, Freren (DE); Andreas Acimas, Solingen (DE); Karsten Baldsiefen, Lindlar (DE)

(73) Assignee: Rasspe Systemtechnik Gmbh, Wermelskirchen (DE)

( * ) Notice: Subject to any disclaimer, the term of this patent is extended or adjusted under 35 U.S.C. 154(b) by 806 days.

(21) Appl. No.: 16/997,138

(22) Filed: Aug. 19, 2020

(65) Prior Publication Data

US 2021/0068347 A1     Mar. 11, 2021

(30) Foreign Application Priority Data

Sep. 6, 2019  (EP) ..................................... 19195962

(51) Int. Cl.
*A01F 15/14*   (2006.01)
*A01F 15/12*   (2006.01)

(52) U.S. Cl.
CPC ............ *A01F 15/145* (2013.01); *A01F 15/12* (2013.01)

(58) Field of Classification Search
CPC ......... A01F 15/145; A01F 15/14; A01F 15/12
See application file for complete search history.

(56) References Cited

U.S. PATENT DOCUMENTS

| 1,169,989 | A | * | 2/1916 | Moore | .................. | A01F 15/145 289/14 |
| 3,232,652 | A | * | 2/1966 | Bonga | .................. | A01F 15/145 289/14 |
| 3,441,302 | A | | 4/1969 | Schuldt | | |
| 3,508,776 | A | * | 4/1970 | Grillot | .................. | A01F 15/145 289/14 |
| 3,570,354 | A | * | 3/1971 | Grillot | .................. | A01F 15/145 83/594 |
| 2007/0180967 | A1 | * | 8/2007 | Wright | .................. | A01F 15/145 83/909 |

(Continued)

FOREIGN PATENT DOCUMENTS

| DE | 201921 C | 5/1907 |
| DE | 2759976 C1 | 7/1982 |

(Continued)

*Primary Examiner* — Ismael Izaguirre
(74) *Attorney, Agent, or Firm* — Sughrue Mion, PLLC

(57) ABSTRACT

A twine knotter including a bill hook for forming a knot in a twine, a twine holding device for clamping twine with a twine holder and a twine disk rotatable relative thereto, the twine disk having recesses over its circumference for receiving twine, a twine feeding device for feeding twine over the bill hook into the twine holding device, and a twine knife for cutting twine. The twine disk has at least two pairs of recesses over the circumference, each pair of recesses having a front recess in a direction of rotation of the twine disk for receiving a single twine strand or a single twine strand pair and a rear recess for receiving a further single twine strand or said single twine strand pair.

11 Claims, 7 Drawing Sheets

(56) References Cited

U.S. PATENT DOCUMENTS

2014/0103647 A1* 4/2014 Schoonheere ........ A01F 15/145
  289/1.5
2015/0272011 A1* 10/2015 Demon .................. B65H 69/04
  100/33 R

FOREIGN PATENT DOCUMENTS

| DE | 8606383 U1 | 8/1990 |
| GB | 497474 A | 12/1938 |
| GB | 1146035 A | 3/1969 |

* cited by examiner

TWINE KNOTTER AND METHOD OF FORMING A KNOT IN A TWINE

CROSS REFERENCE TO RELATED APPLICATION

This application claims priority to and the benefit of European Patent Application No. 19195962.6, filed on Sep. 6, 2019, the entire contents of which are incorporated herein by reference.

BACKGROUND OF THE INVENTION

Field of the Invention

The disclosure relates to a twine knotter comprising a bill hook for forming a knot, a twine holding device for clamping twine with a twine holder and a twine disk rotatable relative thereto, the twine disk having recesses over its circumference for receiving twine, a twine feeding device for feeding twine over the bill hook into the twine holder and a twine knife for cutting through twine.

Background

Twine knotters or tying machines are mainly used in mobile packing presses for the formation of bundles of straw, hay, silage and similar materials as well as in the use of recyclable materials, for example for bundling paper, textiles, thin sheet metal and the like. Binding or bundling equipment fitted with such twine knotters may also form part of packaging machinery for strapping packages, bales or bundles of other materials suitable for this purpose.

In stationary or mobile pack presses, the material to be pressed is compacted in a pressing channel, which is usually rectangular in cross-section, and pressed into a rectangular material strand. The material strand is divided into cuboidal packs—the term square bales is also commonly used—whose top and bottom sides and their outer sides are strapped with several strands of twine in the longitudinal direction of the baling channel, which are knotted before the pack is ejected.

A twine knotter described at the beginning is known from DE 86 06 383 U1, for example. Several of these twine knotters are driven together by one knotter shaft. Each twine knotter has a drive disk which is mounted on the knotter shaft and is connected to it in a rotationally fixed manner. The drive disk has several toothing sections over partial circumferences which mesh with pinions of drive components to drive them in rotation. The toothing sections are combined into groups of toothing sections that serve to form a knot. The twine knotter described in DE 86 06 383 U1 is designed as a single knotter. This means that the drive disk has a single group of toothing sections, so that exactly one knot is tied during one full rotation of the drive disk. In a so-called double knotter, the drive disk has two groups of toothing sections, so that two knots are tied during one full rotation of the drive disk.

The feeding of the necessary twines, the knotting process within the twine knotter and the cooperation of the knotting and pressing elements involved in the formation of a knot are described in detail in document DE 27 59 976 C1, whereby the twine knotter shown there is a double knotter.

A disadvantage of the described state-of-the-art twine knotters is that a twine waste is created between the formation of two knots, which twine residue is not knotted and falls loosely onto the container as waste.

SUMMARY OF THE INVENTION

The twine knotter according to the disclosure comprises a bill hook for forming a knot, a twine holding device for clamping twine, a twine feeding device for feeding twine over the bill hook into the twine holding device and a twine knife for cutting through twine. The twine holding device comprises a twine holder and a twine disk rotatable relative thereto, the twine disk having recesses around its circumference to receive twine. The twine disk has at least two pairs of recesses over the circumference, each pair of recesses having a front recess in a direction of rotation of the twine disk for receiving a single twine strand or a single twine strand pair and a rear recess for receiving a further single twine strand or said single twine strand pair. The twine holder is engaged with the twine disk in a clamping manner over a partial circumference of the twine disk. The twine holder has such a length over the circumference of the twine disk that, at least in one rotational position of the twine disk relative to the twine holder, the twine holder clampingly covers the rear recess of a front pair of recesses of said at least two pairs of recesses that is at the front in the direction of rotation and the front recess of a rear pair of recesses of said at least two pairs of recesses that follows in the direction of rotation, and exposes the front recess of said front pair of recesses.

In a single knotter, each recess takes up exactly one single strand of twine, in contrast to the state-of-the-art twine knotters. The length of the twine holder over the circumference of the twine disk is such that, in a certain rotational position of the twine disk relative to the twine holder and with respect to two pairs of recesses, the twine holder clamps one twine strand in a recess of a pair of recesses and releases another twine to strand in another recess of the same pair of recesses. The twine knife is therefore able to cut through only one twine strand of a recess pair and not to cut the other twine strand of the same recess pair but pull it out of the twine holding device. This ensures that the twine strand section, which according to the state of the art is left over as twine waste in the twine holder and falls out of the twine knotter, is not cut off, but pulled out of the twine holding device and remains at the formed knot. This twine strand section is tied into the knot and forms a loop, whereas the cut twine strand end is pulled completely through the knot without forming a loop.

In a double knotter, it is guaranteed that after the second knot has been formed, the section of the twine pair previously clamped in the twine holding device is released again and is thus not cut by the twine knife but pulled out of the twine holding device. This section of the twine pair is tied into the knot and forms a loop.

In an exemplary design of the twine knotter, the distance between the front recess and the rear recess of a pair of recesses may be smaller over the circumference of the twine disk than the distance between two pairs of recesses adjacent or consecutive over the circumference. Thus, the two individual twine strands, which are knotted together, are kept close to each other over the circumference of the twine disk. This ensures that the two individual twine strands are fed to the bill hook as identically as possible so as not to have a negative effect on knot formation.

In order to facilitate the transfer of twine between the formation of two knots, the twine knotter may also have a twine clamp, located on a side of the twine disk remote from the bill hook, which serves to clamp twine between the rear recess of the front pair of recesses and the front recess of the rear pair of recesses.

In an exemplary embodiment of the twine knotter, it may be provided that the front recesses of the pairs of recesses extend over a larger partial circumference of the twine disk than the rear recesses.

Four pairs of recesses can be evenly distributed over the circumference of the twine disk.

In an exemplary embodiment of the twine knotter, it may be provided that the twine knotter further comprises a rotationally drivable drive disk with at least one group of toothing sections for intermittently driving the bill hook, in particular a bill hook drive shaft of the bill hook, and for driving the twine disk, in particular a twine disk drive shaft of the twine disk. The at least one group of toothing sections comprises a knotter toothing section and a twine disk toothing section each having a plurality of teeth, the twine disk toothing section having a toothless interruption over the circumference.

The toothless interruption in the twine disk toothing section makes it possible that, when forming a knot, the twine disk is rotated over an angular range in such a way that a twine strand can be inserted into the front recess of a pair of recesses and then into the rear recess of the same pair of recesses.

For rotary driving, the teeth of the bill hook toothing section can mesh with a bill hook pinion and the teeth of the twine disk toothing section can mesh with a twine disk pinion.

To make the twine knotter a double knotter, the drive disk can have two groups of toothing sections to form two knots during one full rotation of the drive disk.

To make the twine knotter a single knotter, the drive disk can have a single group of toothing sections to form a single knot during one full rotation of the drive disk.

A method of forming two knots by means of a twine knotter described above, which is designed as a double knotter, comprises the following sequence of method steps:
1. Feeding a single pair of twine strands by means of the twine feeding device over the bill hook into the rear recess of the front pair of recesses,
2. Rotating the twine disk until the rear recess of the front pair of recesses reaches a clamping position range in which the twine holder covers the rear recess of the front pair of recesses in a clamping manner, and simultaneously rotating the bill hook by one full revolution to form a loop for a first knot in the single twine strand pair,
3. Cutting through the individual twine strand pair between the bill hook and the rear recess of the front pair of recesses of the twine holding device by means of the twine knife while the rear recess of the front pair of recesses is covered by the twine holder in a clamping manner,
4. Continue turning the twine disk until the front recess of the rear pair of recesses reaches the insertion position,
5. Feeding the individual twine strand pair by means of the twine feeding device into the front recess of the rear pair of recesses,
6. Rotating the bill hook by one full turn to form a loop for a second knot in the single twine pair as long as at least one of the rear recess of the front pair of recesses and front recess of the rear pair of recesses is clamped by the twine holder,
7. Rotating the twine disk until the front recess of the rear pair of recesses has reached a release position in which the twine holder releases the front recess of the rear pair of recesses, and
8. Pulling out the individual twine strand pair from the twine holding device by means of the twine knife.

This ensures that the twine strand section, which according to the state of the art is left over as twine waste in the twine holders and falls out of the twine knotter, is not cut off, but pulled out of the twine holding device and remains at the formed second knot. This section of the twine strand is tied into the knot and forms a loop.

A further method of forming a knot by means of a twine knotter described above, which is designed as a single knotter, comprises the following sequence of method steps:
1. Guiding a first individual twine strand over the bill hook to a bundle, wherein the first individual twine strand is clamped in the front recess of the front pair of recesses between the twine disk and the twine holder,
2. Feeding a second single twine strand by means of the twine feeding device over the bill hook into the rear recess of the front pair of recesses,
3. Rotating the twine disk until the rear recess of the front pair of recesses reaches a clamping position range in which the twine holder covers the rear recess of the front pair of recesses in a clamping manner, and simultaneously rotating the bill hook by one full rotation to form a loop for a common knot in both twine strands,
4. Continue turning the twine disk until the front recess of the rear pair of recesses reaches the insertion position,
5. Feeding the second individual twine strand by means of the twine feeding device into the front recess of the rear pair of recesses,
6. Rotating the twine disk until the front recess of the front pair of recesses reaches a release position in which the twine holder releases the front recess of the front pair of recesses, and the front recess of the rear pair of recesses reaches the clamping position range,
7. Cutting through the second twine strand between the bill hook and the twine holding device using the twine knife, and
8. Pulling the first twine strand out of the twine holding device using the twine knife.

This ensures that the twine strand section, which according to the state of the art is left over as twine waste in the twine holders and falls out of the twine knotter, is not cut off, but pulled out of the twine holding device and remains at the formed knot. This twine strand section is tied into the knot and forms a loop, whereas the cut twine strand end is pulled completely through the knot without forming a loop.

BRIEF DESCRIPTION OF THE DRAWINGS

Exemplary embodiments of the disclosure are explained in more detail below with reference to the drawings.

DETAILED DESCRIPTION OF THE PREFERRED EMBODIMENTS OF THE INVENTION

Figure 1:
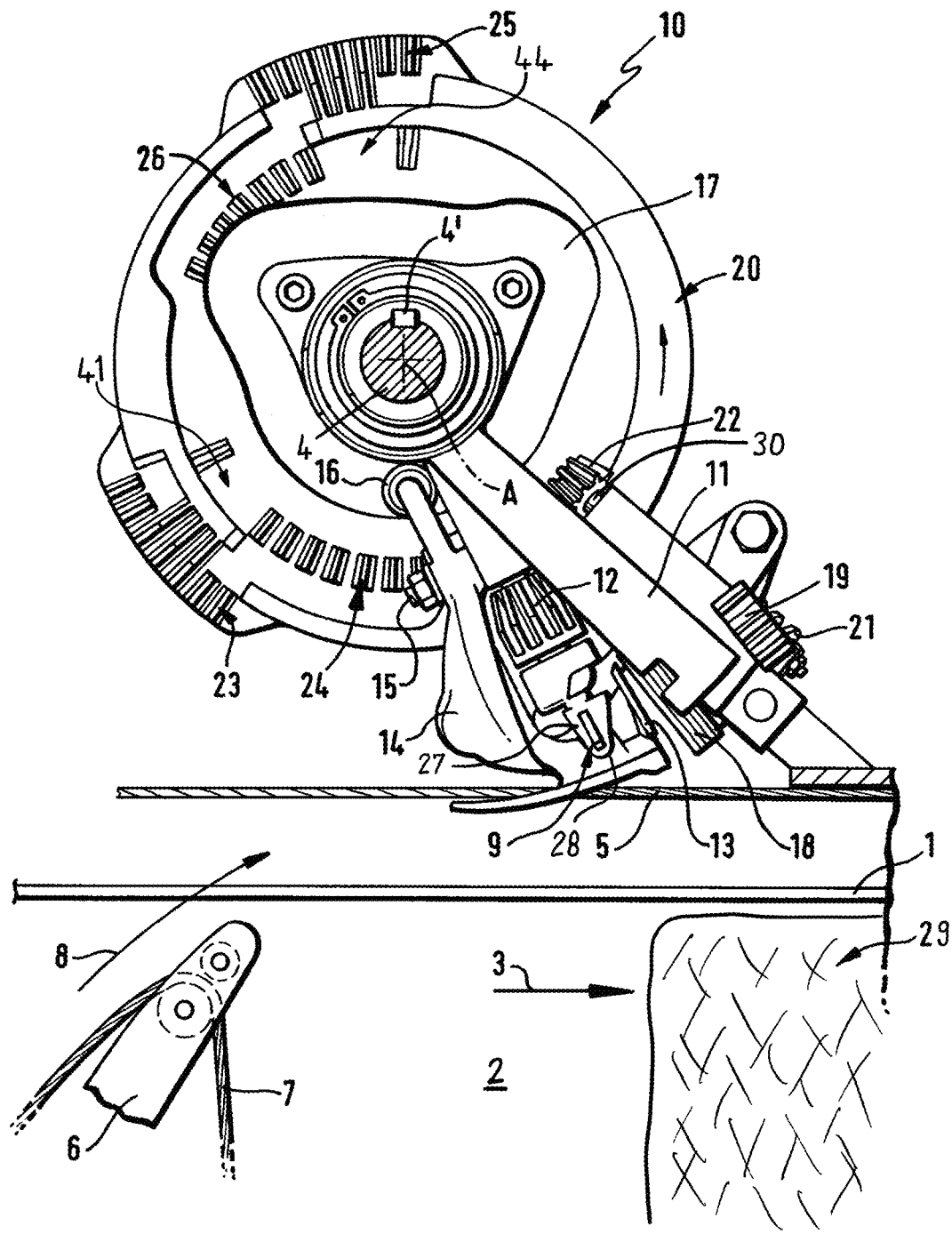
FIG. 1 is a side view in the direction of the axis of the knotter shaft of a twine knotter (double knotter) attached to a baler to form two knots.
Figure 2:
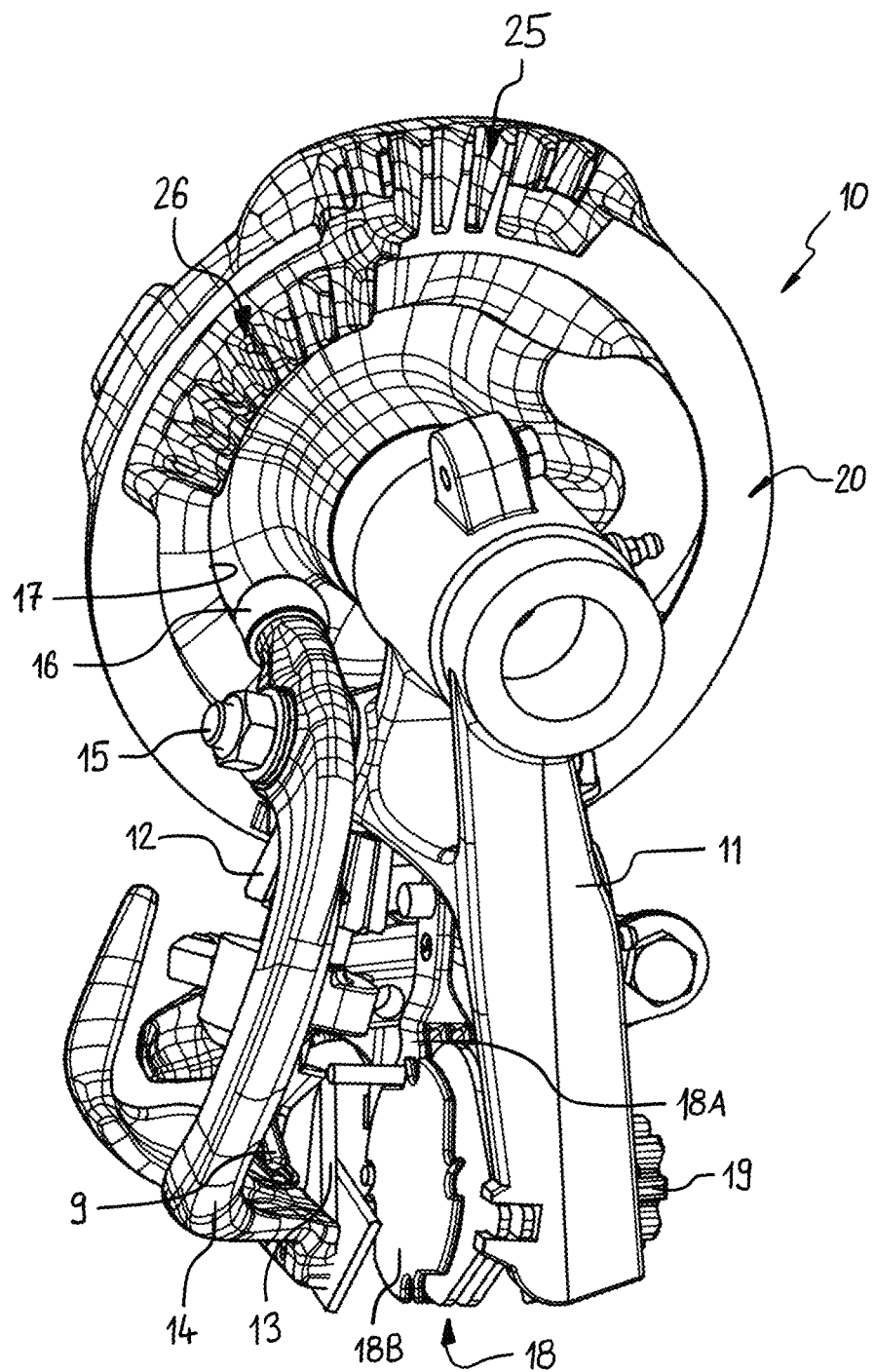
FIG. 2 is a perspective view of a twine knotter (single knotter) to form one knot.

FIG. 1 shows a first exemplary embodiment of a twine knotter 10, which is designed as a double knotter to produce two knots. FIG. 2 shows a second exemplary embodiment of a twine knotter 10, which is designed as a single knotter to produce one knot. Identical components have the same reference signs and are described together below, with special attention being paid to differences.

FIG. 1 shows an upper wall 1 of a baling channel 2, through which material to be baled, e.g. straw, is conveyed in conveying direction 3, wherein a bale 29 is formed from baled material. Above the upper wall 1, a knotter shaft 4 extending across the width of the baling channel 2 is mounted rotatably about an axis A, on which, depending on the width of baling channel 2, several twine knotters 10 can be arranged. Each twine knotter 10 is associated with a twine loop or strapping made of a first twine strand 5 and a second twine strand 7 laid around the bale 29 in a vertical longitudinal plane at a right angle to the axis A, which in the exemplary embodiment of FIG. 1 is closed by forming two knots produced by the twine knotter 10 (double knotter). The first twine strand 5 of the twine, which runs over the top of the bale 29, comes from the front side (not shown), which is located to the right of the twine knotter 10 in the illustration shown in FIG. 1, of the bale 29 in conveying direction 3. The first twine 5 is held taut by means not shown in FIG. 1, which are located to the left of twine knotter 10. (In the case of single knotters as shown in FIG. 2, a section of the first twine strand is also clamped in a twine holding device of the twine knotter during the pressing phase.) In the case of double knotters as shown in FIG. 1, a section of twine strand is tensioned by means located outside the twine knotter 10.

A baler needle 6 guides a second twine strand 7 of the twine around the rear end face of the bale 29 from below in the direction of arrow 8, so that the second twine strand 7 can be brought together with the first twine strand 5 in the area of the twine knotter 10 to form a twine strand pair and can be knotted.

The twine knotter 10 comprises a bill hook 9, which is rotatable in a knotter frame 11 about an axis B orientated transversely, preferably radially, to the knotter shaft 4, as shown in FIG. 1 diagonally upwards, and is drivable about this axis B via a pinion 12.

A twine knife 13 is movably arranged transversely to the twine strands 5, 7 in order to cut the twine after knot formation. The twine knife 13 is attached to a knife arm 14, which is pivotally mounted about an axis E of a shaft journal 15 in a bearing in the knotter frame 11 and is moved by a roller 16, which is displaced in a groove 17 of a drive disk 20.

A twine holding device 18 holds the twine strands 5, 7 in position during certain working phases of the bill hook 9 and the twine knife 13. The twine holding device 18 is rotatable about an axis D inclined forwards at an angle of approximately 45° in a vertical plane. The twine holding device 18 comprises a twine holder 18A (FIG. 5) and a twine disk 18B (FIGS. 3 and 4), which is driven in rotation and is mounted with a shaft 39 in a bearing on the knotter frame 11. The twine disk 18B is driven by a pinion 19 which engages with a worm gear 21 driven by a pinion 22. The worm gear 21 is located at one end of a pinion shaft 30, to the other end of which the pinion 22 is attached.

The pinions 12, 22 are driven in the twine knotter 10 in the form of a single knotter according to FIG. 2, which produces only one knot during one rotation of the drive disk 20, by one toothing section 25, 26 on the drive disk 20 at a time. The binding method is described in detail in EP 0 237 771 A1.

In the case of double knotters according to the exemplary embodiment shown in FIG. 1, two knots are generated per each full rotation of the drive disk 20. Here the pinions 12, 22 are driven by two groups, in the shown exemplary embodiment by pairs, of toothing sections 23, 24 and 25, 26 respectively, which are arranged on the flat side of the drive disk 20 facing the observer in FIG. 1 in the area of its outer edge. The toothing sections 24, 26 (twine disk toothing sections) are identical to each other and are located radially a little further inside, so that when the drive disk 20 rotates, they can only engage with the pinion 22 to drive the twine disk 18B. The toothing sections 23, 25 (bill hook toothing sections) are also identical to each other and lie radially on to the very outside and drive the pinion 12 to drive the bill hook 9.

The twine disk toothing sections 23, 24 and the bill hook toothing sections 25, 26 each have several teeth. The twine disk toothing sections 24, 26 have a toothless interruption 41, 44, so that the twine disk is briefly stopped when it passes completely through one of the twine disk toothing sections 24, 26. This is necessary because, as will be explained below, the twine disk has several pairs of recesses around its circumference and the twine disk is turned from one pair of recesses to the next pair of recesses over a section of the respective twine disk toothing section 24, 26. When rotating from one recess of a pair of recesses to another recess of the same pair of recesses, especially in the case of a double knotter, a deceleration of the twine disk is necessary so that the other driven components interact with the twine disk in the appropriate sequence at the appropriate time.

The toothing sections 25, 26 also follow the toothing sections 23, 24 when the drive disk 20 rotates counterclockwise through an angle of about 115° in the circumferential direction. The toothing sections 23, 25 extend over an angle of about 30°, the toothing sections 24, 26 over an angle of about 40°.

The twine knotter 10 shown in FIG. 1 performs two knotting operations one after the other during one rotation of the drive disk 20. A first knot connects the lower second twine strand 7 coming up behind the rear end of the bale 29 with the upper first twine strand 5, forming a closed twine loop which wraps around the bale 29. A second knot connects the twine coming up at the front end of the following bale with the twine running on top of the following bale, thus forming a new twine loop for the new bale to be formed, into which the bale is pressed. Between the knots the twine is cut off so that the successive bales are separated.

The twine knotter 10 shown in FIG. 2 performs one knotting operation during one rotation of the drive disk 20. Only a lower twine 7 is used. There is no reel for an upper twine strand, as in double knotters.

The lower twine strand 7 is fed to the twine knotter 10 from below by means of the baler needle upwards. There it is clamped and the baler needle moves down again. The bale 29 is pressed into the twine loop which is thus spanned. After completion of the bale 29, the baler needle guides the lower twine strand 7 at the rear end of the bale 29 upwards to the twine knotter 10, which knots the end of the twine strand 7 clamped in the twine knotter 10 with the end of the twine strand 7 fed from below in order to strap the finished bale 29 with twine. Here the twine strand 7 is cut through and the free end of the twine strand 7 is clamped in the twine knotter 10, so that a further twine loop is formed into which the following bale can be pressed.

The bill hook has a bill hook jaw, which is formed by a hooked area 27 and a bill hook tongue 28. The bill hook tongue 28 forms a two-armed lever, which is pivotably mounted about a pivot axis. One arm (tongue section) of the lever interacts with the hooked area 27 of the bill hook 9 to form the bill hook jaw. The other arm of the lever is provided with a tongue roller (not shown here) being rotatably mounted.

Opening of the bill hook jaw is achieved by the fact that during the rotation of the bill hook 9 the tongue roller runs over a cam surface (not shown here), whereby the tongue roller is lifted and the tongue section is lifted from the hooked area 27.

Figure 3:
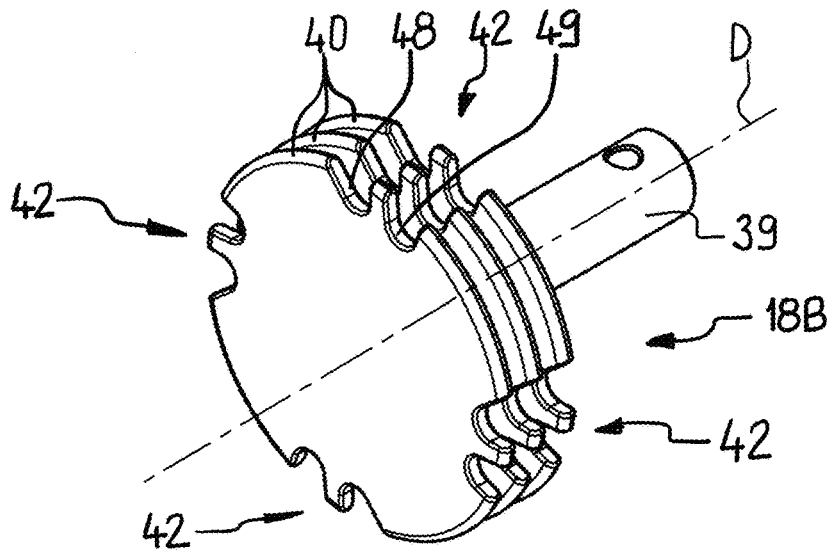
FIG. 3 is a perspective view of a twine disk of the twine knotter as shown in FIG. 1.
Figure 4:
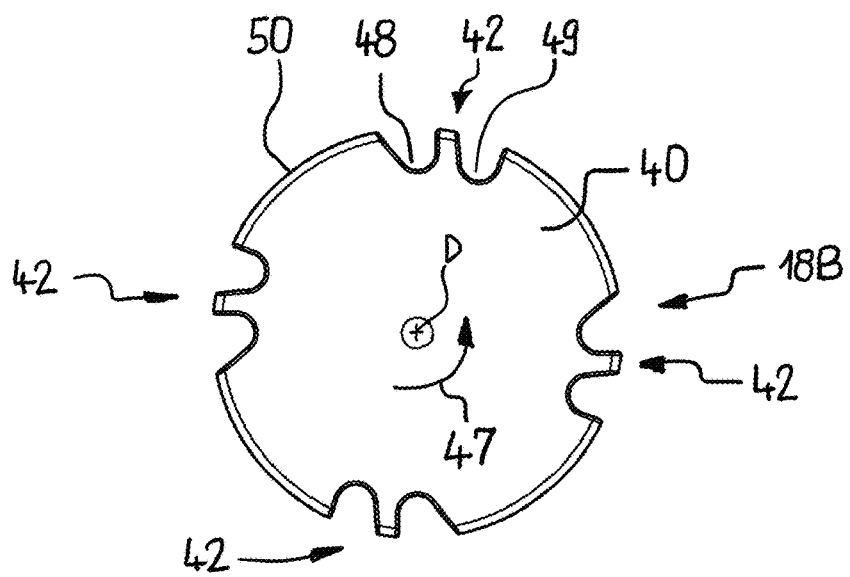
FIG. 4 is a front view of the twine disk as shown in FIG. 2.

FIG. 3 shows the twine disk 18B in a perspective view and FIG. 4 shows the twine disk 18B in a front view in the direction of the axis of rotation, FIGS. 3 and 4 being described together below.

The twine disk 18B comprises three twine disk plates 40, which are connected to the shaft 39 and are arranged congruently next to each other and spaced apart in the direction of the axis. The twine disk 18B is driven in a direction of rotation 47 (FIG. 4).

The twine disk plates 40 each have four pairs of recesses 42. Each pair of recesses 42 has a front recess 48 in the direction of rotation 47 of twine disk 18B and a rear recess 49 in the direction of rotation 47 of twine disk 18B. The recesses 48, 49 start from an outer circumferential edge 50 of the respective twine disk plate 40 and run inwards. Viewed over the circumference of the respective twine disk plate 40, the distance between the front recess 48 and the rear recess 49 of a pair of recesses 42 is less than the distance between two adjacent pairs of recesses 42.

Figure 5:
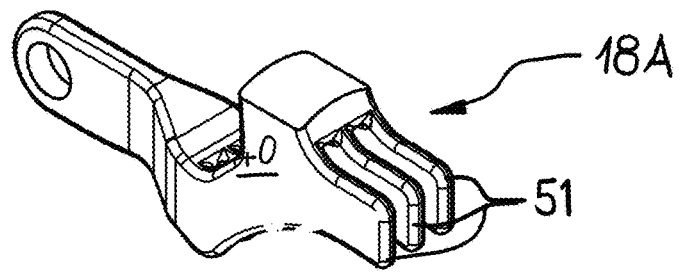
FIG. 5 is a perspective view of a twine holder of the twine knotter as shown in FIG. 1.

FIG. 5 shows a perspective view of the twine holder 18A. The twine holder has three parallel and spaced apart slats 51. When mounted, the slats 51 of the twine holder 18A mesh over a limited circumferential section of the twine disk plates 40 of the twine disk 18B with the twine disk plates 40.

This allows twine to be clamped between the twine disk plates 40 and the slats 51. For this purpose, twine strands can be inserted into the recesses 48, 49 parallel to the axis of rotation D. By rotating the twine disk 18B around the axis D, that recess 48, 49, in which the twine strand has been inserted, is turned into the area of the twine holder 18A, so that this recess 48, 49 is clamped by the twine holder 18A and the twine strand is clamped between the twine disk plates 40 of the twine disk 18B and the slats 51 of the twine holder 18A.

Figure 6:
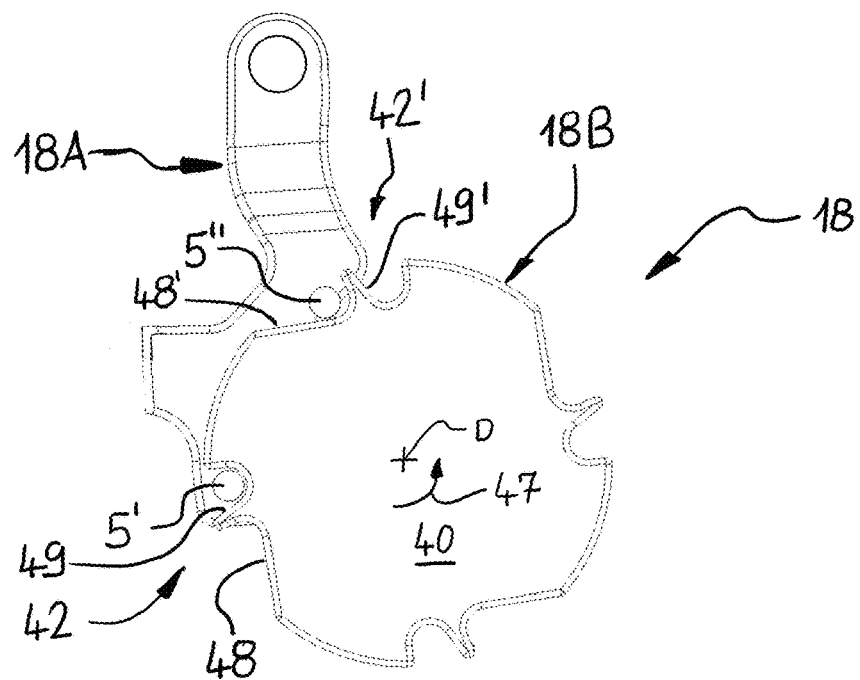
FIG. 6 is a front view of the twine holding device with a twine disk and a twine holder as shown in FIGS. 3 to 5.

FIG. 6 shows a front view of the twine holding device 18 with the twine disk 18B and the twine holder 18A according to FIGS. 4 to 6. A first twine strand is arranged with a first end 5' in the rear recess 49 of a front pair of recesses 42 and with a second end 5" in the front recess 48' of a rear pair of recesses 42.

The twine disk plate 40 is in a turning position in which the twine holder covers the rear recess 49 of the front pair of recesses 42 and front recess 48' of the rear pair of recesses 42' in a clamping manner so that both ends 5', 5" of the first twine strand 5 are secured. The front recess 48 of the front pair of recesses 42 and the rear recess 49' of the rear pair of recesses 42' are not covered by the twine holder 18A.

Figure 7:
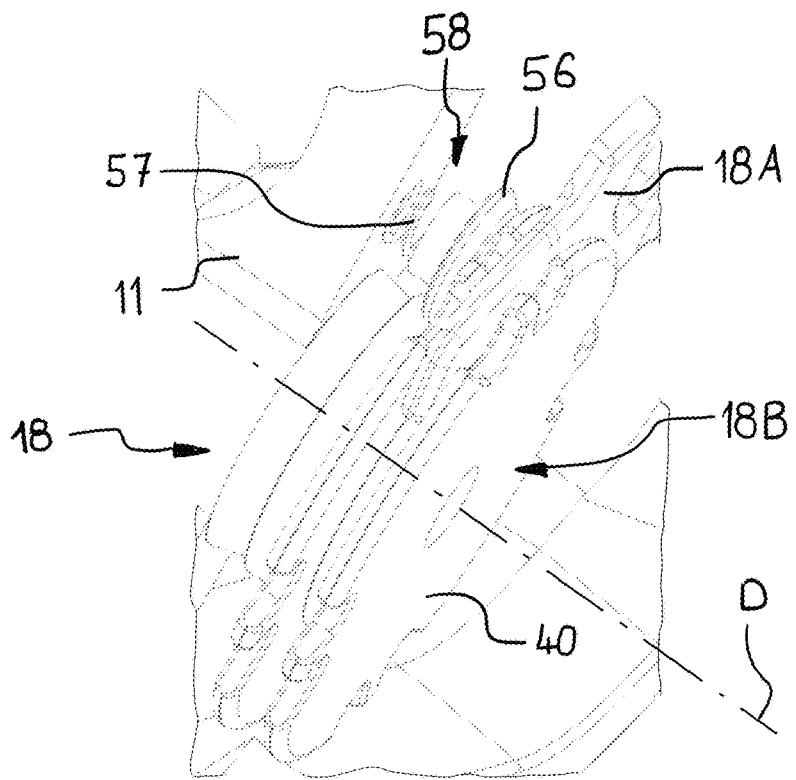
FIG. 7 is a perspective view of another example of a twine holding device with a passive clamping element.

FIG. 7 shows another example of a twine holding device with a passive twine clamp 58, which is located on a side of the twine disk 18B that faces away from the bill hook. The twine clamp 58 has a clamping element 56 and a pressure spring 57. The clamping element 56 is supported against the twine disk 18B axially parallel to the axis D, around which the twine disk 18B is rotated. The clamping element 56 is supported in the radial area of the pars of recesses 42 of the twine disk 18B. The pressure spring 57 is supported between the knotter frame 11 and the clamping element 56 and applies force to the clamping element 56 against the twine disk 18B, so that a twine strand can be clamped between the clamping element 56 and the twine disk 18B. The passive twine clamp 58 facilitates the transfer of twine, especially between the formation of two knots in a double knotter.

FIGS. 8 to 11 schematically show the procedure for forming two knots by means of a twine knotter as shown in FIG. 1, which is designed as a double knotter. FIGS. 8 to 11 show schematically an unwinded contour of the outer peripheral edge 50 of one of the twine disk plates 40 of the twine disk 18B as shown in FIGS. 3 and 4. They also show schematically the twine holder 18A for clamping twine strands between the twine holder 18A and the twine disks 18B.

Figure 8:
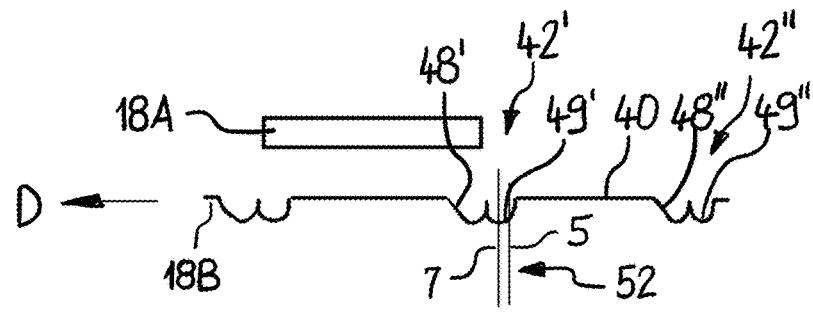
FIG. 8 is a schematic representation of a first position of the twine disk relative to the twine holder, wherein the twine knotter is designed as a double knotter.

FIG. 8 shows the condition after feeding a single pair of twine strands 52 by means of a twine feeding device in the form of a baler needle 6 (FIG. 1) over the bill hook into the rear recess 49' of a front recess pair 42' of pairs of recesses 42 according to FIGS. 3 and 4. The single twine pair 52 is formed from the first twine strand 5, which runs over the top of the bale 29 (FIG. 1), and the second twine strand 7, which was conveyed upwards by the baler needle 6 (FIG. 1). The rear recess 49' of the front pair of recesses 42' is in an insertion position shortly before reaching the twine holder 18A.

In the further course of the process, the twine disk 18B is rotated in direction of rotation D relative to the twine holder 18A. This corresponds to a movement of the twine disk 18B to the left in the direction of the arrow, as shown in FIGS.

Figure 9:
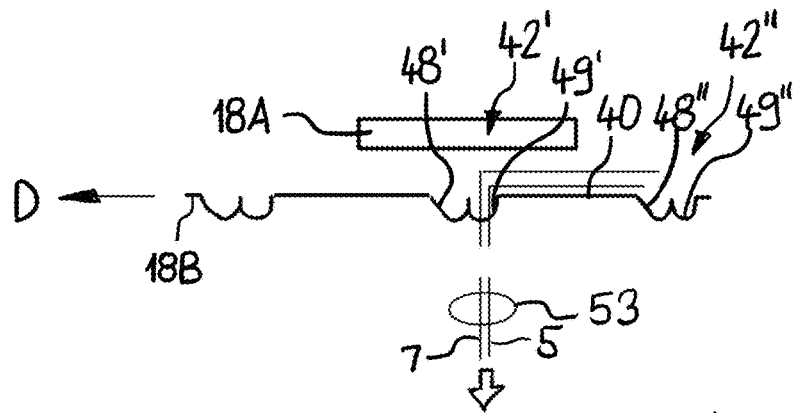
FIG. 9 is a schematic representation as shown in FIG. 5, showing the twine disk in a second position relative to the twine holder.

8 to 11. Here the rear recess 49' of the front pair of recesses 42' reaches a clamping position range in which the rear recess 49' of the front pair of recesses 42' is clamped by the twine holder 18A, so that the pair of twine strands 52 is clamped between the twine holder 18A and the twine disk 18B. At the same time, the bill hook is rotated through one full rotation to form a loop for a first knot 53 in the single twine pair 52. Then the single twine strand 52 is cut through between the bill hook, respectively the first knot 53, and the rear recess 49' of the front pair of recesses 42', respectively the twine disk 18B, as long as the rear recess 49' of the front pair of recesses 42' is clamped by the twine holder 18A, i.e. the twine strand 52 is clamped. This results in the situation as shown in FIG. 9. The twine strand 5 that runs on top of the bale 29 and the twine strand 7 that comes or is fed from below are thus connected to each other by means of the first knot 52, so that the bale is strapped with twine.

Figure 10:
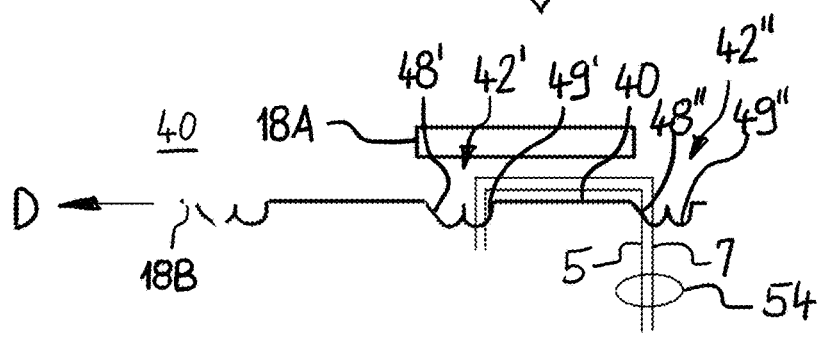
FIG. 10 is a schematic representation as shown in FIG. 5, showing the twine disk in a third position relative to the twine holder.

To form a second knot 54, the twine disk 18B is rotated further until the front recess 48" of the rear pair of recesses 42" reaches the insertion position, i.e. a position just before the twine holder 18A. In this position, the individual twine strand pair 52 is inserted into the front recess 48" of the rear pair of recesses 42" by means of the twine feeding device in the form of the baler needle 6 (FIG. 1) shown as an example. The twine strand pair 52 thus runs from a front face of the twine disk 18B through the rear recess 49' of the front pair of recesses 42' to a rear face of the twine disk 18B and from there again through the front recess 48" of the rear pair of recesses 42" to the front face. There, by rotating the bill hook through one full rotation, a second knot 54 is formed in the twine strand pair 52. The bill hook is rotated as long as at least one of the recesses 49', 48" in which the twine strand pair 52 is arranged, i.e. the rear recess 49' of the front pair of recesses 42' or the front recess 48" of the rear pair of recesses 42", is clamped by the twine holder 18A to clamp the twine strand pair 52. An exemplary position is shown in FIG. 10.

Figure 11:
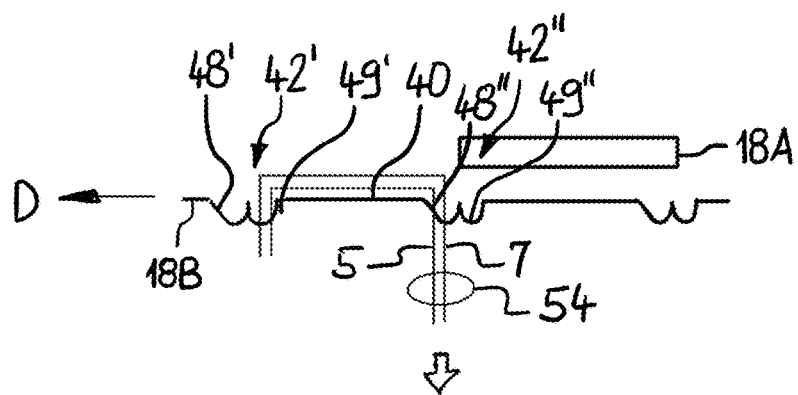
FIG. 11 is a schematic representation as shown in FIG. 5, showing the twine disk in a fourth position relative to the twine holder.

Finally, the twine disk 18B is rotated until the front recess 48" of the rear pair of recesses 42" has reached a release position in which the twine holder 18A releases the front recess 48" of the rear pair of recesses 42". In this position, the single twine strand pair 52 is then pulled out of the twine holding device 18, which comprises the twine holder 18A and the twine disk 18B, as indicated in FIG. 11. A new twine loop is thus formed by the first twine strand 5 at the top and the second twine strand 7 at the bottom, into which a new bale can be pressed.

Since that part of the twine pair 52, which is located on the back of the twine disk 18B, is not separated from the second knot 54, but remains at the second knot 54, no twine waste is produced which would be released and would fall as waste onto the pressed product.

FIGS. 12 to 16 show schematically the procedure for forming a single knot using a twine knotter as shown in FIG. 2. The double knotter according to FIG. 1 has two toothing sections 23, 25 for driving the bill hook 9 and two toothing sections 24, 26 for driving the twine disk 18B. Thus, the bill hook 9 makes two full rotations of the drive disk 20 around the axis A to form two knots. The twine disk 18B is driven accordingly. In contrast, the single knotter as shown in FIG. 2 has only two of the toothing sections 25, 26, so that for one full rotation of the drive disk 20 the bill hook 9 makes one full rotation to form a knot. Accordingly, the twine disk 18B is also driven only once, parallel to the knot formation. In addition, the first twine strand 5 is not clamped in a mechanism separate from the twine knotter or in a separate holding device while the bale is being formed. With the single knotter, the first twine strand 5 is clamped by the twine holding device 18 while the bale is being formed.

FIGS. 12 to 16 show schematically an unwinded contour of the outer peripheral edge 50 of one of the twine disk plates 40 of the twine disk 18B as shown in FIGS. 3 and 4. Furthermore, they schematically show the twine holder 18A for clamping twine strands 5, 7 between the twine holder 18A and the twine disks 18B.

Figure 12:
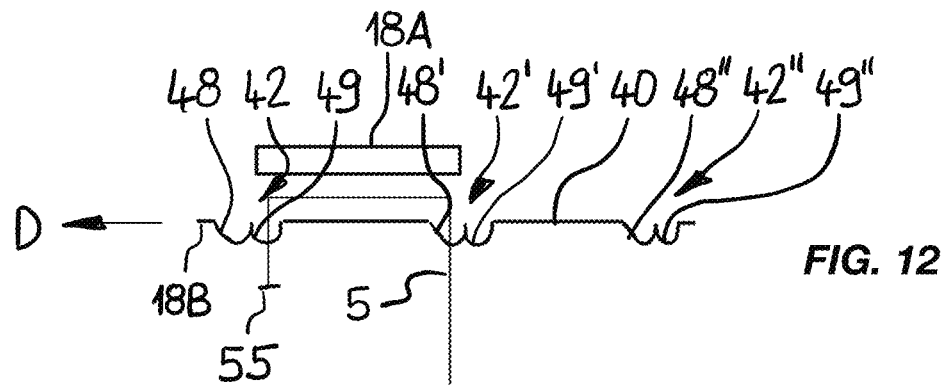
FIG. 12 is a schematic representation of a first position of the twine disk relative to the twine holder, with the twine knotter being a single knotter.

FIG. 12 shows the situations of the twine holding device with twine holder 18A and twine disk 18B after a first individual twine strand 5 has been led over the bill hook according to FIG. 1 to a bundle (for example a bale), whereby the first individual twine strand 5 is inserted in the front recess 48' of the front pair of recesses 42' and clamped between the twine disk 18A and the twine holder 18B. The first twine strand 5 is still in this position from a previous knot formation and is held clamped. Here, a cut end 55 of the first twine strand 5 is located on a front side of the twine disk 18B. The first twine strand 5 is inserted from the cut end 55 through the rear recess 49 of a pair of recesses 42' leading the front pair of recesses 42' and is led to a rear face of the twine disk 18B. From there, the first twine strand 5 is again guided through the front recess 48' of the front pair of recesses 42' to the front of the twine disk 18B and clamped between the twine holder 18A and the twine disk 18B.

Figure 13:
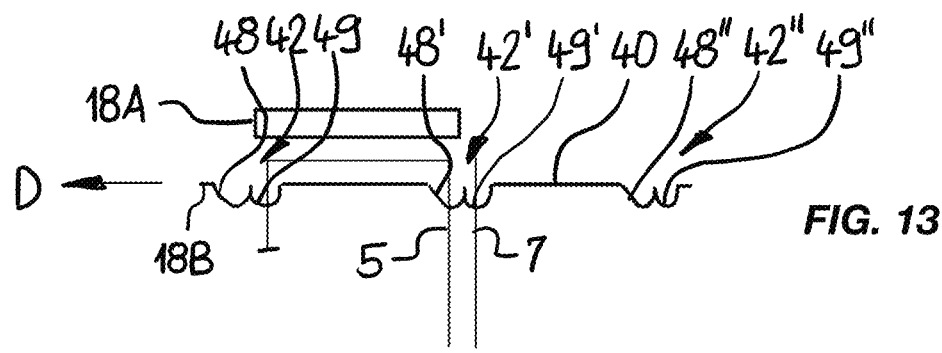
FIG. 13 is a schematic representation as shown in FIG. 9, showing the twine disk in a second position relative to the twine holder.

Then a second single twine strand 7 is inserted into the rear recess 49' of the front pair of recesses 42' by means of a twine feeding device in the form of a baler needle, for example, over the bill hook. As shown in FIG. 13, the rear recess 49' of the front pair of recesses 42' is in an insertion position just before reaching the twine holder 18A.

Figure 14:
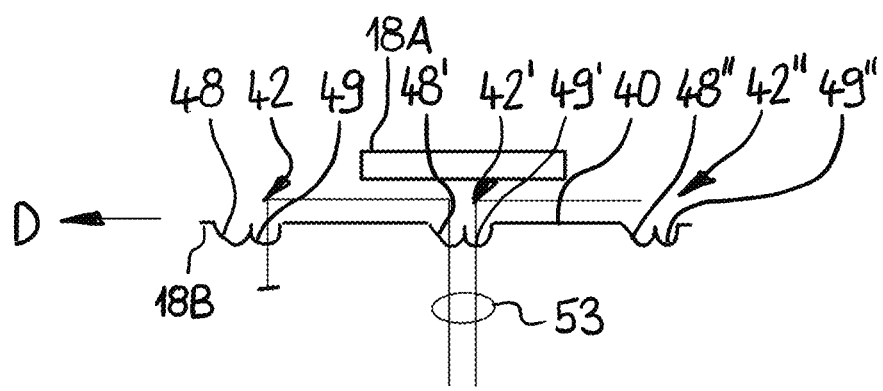
FIG. 14 is a schematic representation as shown in FIG. 9, showing the twine disk in a third position relative to the twine holder.

Then the twine disk 18B is rotated until the rear recess 49' of the front pair of recesses 42' reaches a clamping position in which the twine holder 18A covers the rear recess 49' of the front pair of recesses 42'. While the rear recess 49' of the front pair of recesses 42' is in the clamping position range, the bill hook is rotated through one full rotation to form a common knot 53 in the first twine strand 5 and the second twine strand 7. This situation is illustrated in FIG. 14.

Figure 15:
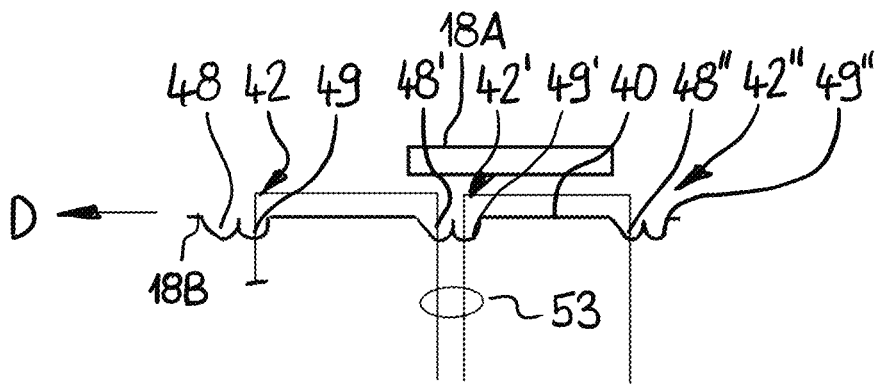
FIG. 15 is a schematic representation as shown in FIG. 9, showing the twine disk in a fourth position relative to the twine holder.
Figure 16:
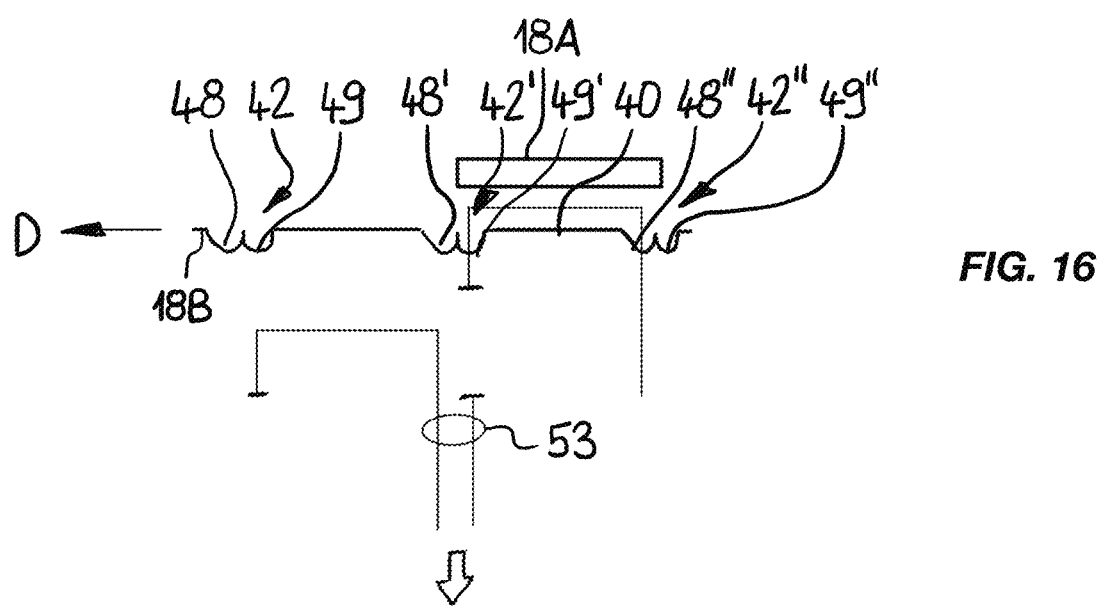
FIG. 16 is a schematic representation as shown in FIG. 9, showing the twine disk in a fifth position relative to the twine holder.

Then the twine disk 18B is rotated further until the front recess 48" of the rear pair of recesses 42" reaches the insertion position just before reaching the twine holder 18A. In this position, the second single twine strand 7 is inserted by means of the baler needle into the front recess 48" of the rear pair of recesses 42". The second single twine 7 thus runs from knot 53 from a front face of the twine disk 18B through the rear recess 49' of the front pair of recesses 42' to a rear face of the twine disk 18B and back to the front face through the front recess 48" of the rear pair of recesses 42". This situation is illustrated in FIG. 15.

Then the twine disk 18B is rotated further until the front recess 48' of the front pair of recesses 42' reaches a release position in which the twine holder 18B releases the front recess 48' of the front pair of recesses 42' and the front recess 48" of the rear pair of recesses 42" has reached the clamping position range. In this position, the second twine strand 7 between the bill hook, respectively the knot 53, and the twine holder, respectively the twine disk 18B, is cut through by means of the twine knife and the first twine strand 5 is pulled out of the twine holding device 18 by means of the twine knife, as shown schematically in FIG. 16. Since the second twine strand 7 is clamped in the twine holding device, it can be cut through with the twine knife. As the first twine strand 5 is no longer clamped by the twine holding device 18, it is not cut by the twine knife but pulled out of the twine holding device. That part of the first twine strand 5 which was on the back of the twine disk 18B is thus not completely separated and does not fall to the ground as waste, but remains at knot 53. It is preferable to pull this part of the first twine strand 5 partially through the knot 53 so that a loop is formed. The cut end of the second twine 7, which is still at knot 53, is preferably pulled completely through knot 53.

LIST OF REFERENCE SIGNS

1 Wall
2 Baling channel
3 Conveying direction
4 Knotter shaft
5 First twine strand
6 Baler needle
7 Second twine strand
8 Arrow
9 Bill hook
10 Twine knotter
11 Knotter frame
12 Pinion
13 Twine knife
14 Knife arm
15 Shaft journal
16 Roller
17 Groove
18 Twine holding device
18A Twine holder
18B Twine disk
19 Pinion
20 Drive disk
21 Worm gear
22 Pinion
23 Toothing section (bill hook toothing section)
24 Toothing section (driving toothing section)
25 Toothing section (bill hook toothing section)
26 Toothing section (driving toothing section)
27 Hooked area
28 Bill hook tongue
29 Bale
30 Pinion shaft
39 Shaft
40 Twine disk plate
41 Toothless interruption
42 Pair of recesses
42' Front pair of recesses
42" Rear pair of recesses
43 Pivot axis
44 Toothless interruption
45 Tongue roller
46 Cam surface
47 Direction of rotation
48 Front recess
48' Front recess of the front pair of recesses
48" Front recess of the rear pair of recesses
49 Rear recess
49' Rear recess of the front pair of recesses
49" Rear recess of the rear pair of recesses
50 Outer circumferential edge
51 Slat
52 Twine strand pair
53 First knot
54 Second knot
55 End
56 Clamping element
57 Pressure spring
58 Twine clamp A Axis
D Axis

The invention claimed is:

1. A Twine knotter comprising:
a bill hook for forming a knot in a twine,
a twine holding device for clamping twine, the twine holding device comprises a twine holder and a twine disk rotatable relative to the twine holder, the twine disk has at least two pairs of recesses over its circumference for receiving twine, each pair of recesses having a front recess in a direction of rotation of the twine disk for receiving a single twine strand or a single twine strand pair and a rear recess for receiving a further single twine strand or said single twine strand pair,
a twine feeding device for feeding twine over the bill hook into the twine holding device, and
a twine knife for cutting twine,
wherein the twine holder is engaged with the twine disk in a clamping manner over a partial circumference of the twine disk, the twine holder having such a length over the circumference of the twine disk that, at least in one rotational position of the twine disk relative to the twine holder, the twine holder clampingly covers the rear recess of a front pair of recesses of said at least two pairs of recesses that is at the front in the direction of rotation and the front recess of a rear pair of recesses of said at least two pairs of recesses that follows in the direction of rotation, and exposes the front recess of said front pair of recesses.

2. The twine knotter of claim 1, wherein, over the circumference of the twine disk, the distance between the front recess and the rear recess of a pair of recesses is smaller than the distance between two pairs of recesses adjacent over the circumference.

3. The twine knotter of claim 1 wherein the twine knotter further comprises a twine clamp arranged on a side of the twine disk facing away from the bill hook and serving to clamp twine between the rear recess of the front pair of recesses and the front recess of the rear pair of recesses.

4. The twine knotter of claim 1 wherein the front recesses of the pairs of recesses extend over a larger partial circumference of the twine disk than the rear recesses.

5. The twine knotter of claim 1 wherein the twine knotter has four pairs of recesses which are arranged uniformly distributed over the circumference of the twine disk.

6. The twine knotter of claim 1 wherein the twine knotter further comprises, for forming a knot, a rotationally drivable drive disk with at least one group of toothing sections for intermittently driving the bill hook and the twine disk,
wherein the at least one group of toothing sections has a bill hook toothing section and a twine disk toothing section each having a plurality of teeth, and
wherein the twine disk toothing section has a toothless interruption over the circumference.

7. The twine knotter of claim 6, wherein the teeth of the bill hook toothing section mesh with a pinion of the bill hook, and
wherein the teeth of the twine disk toothing portion mesh with a pinion of the twine disk.

8. The twine knotter of claim 6 wherein the drive disk has two groups of toothing sections.

9. The twine knotter of claim 6 wherein the drive disk has one group of toothing sections.

10. A method of forming two knots by means of a twine knotter according to claim 8, the method comprising the following sequence of method steps:

feeding a single pair of twine strands by means of the twine feeding device over the bill hook into the rear recess of the front pair of recesses, rotating the twine disk until the rear recess of the front pair of recesses reaches a clamping position range in which the twine holder covers the rear recess of the front pair of recesses in a clamping manner, and simultaneously rotating the bill hook by one full revolution to form a loop for a first knot into the single twine strand pair, cutting through the individual twine strand pair between the bill hook and the rear recess of the front pair of recesses of the twine holding device by means of the twine knife while the rear recess of the front pair of recesses is covered by the twine holder in a clamping manner, continue turning the twine disk until the front recess of the rear pair of recesses reaches the insertion position, feeding the individual pair of twine strands by means of the twine feeding device into the front recess of the rear pair of recesses, rotating the bill hook by one full turn to form a loop for a second knot in the single twine strand pair as long as at least one of the rear recess of the front pair of recesses and front recess of the rear pair of recesses is clamped by the twine holder, rotating the twine disk until the front recess of the rear pair of recesses has reached a release position in which the twine holder releases the front recess of the rear pair of recesses, and pulling out the individual twine strand pair from the twine holding device by means of the twine knife.

11. A method of forming a knot by means of a twine knotter according to claim 9, the method comprising the following sequence of method steps:

guiding a first individual twine strand over the bill hook to a bundle, wherein the first individual twine strand is clamped in the front recess of the front pair of recesses between the twine disk and the twine holder, feeding a second individual twine strand by means of the twine feeding device over the bill hook into the rear recess of the front pair of recesses, rotating the twine disk until the rear recess of the front pair of recesses reaches a clamping position range in which the twine holder covers the rear recess of the front pair of recesses in a clamping manner, and simultaneously turning the bill hook by one full turn to form a loop for a common knot in both twine strands, continue turning the twine disk until the front recess of the rear pair of recesses reaches the insertion position, feeding the second individual twine strand by means of the twine feeding device into the front recess of the rear pair of recesses, turning the twine disk until the front recess of the front pair of recesses reaches a release position in which the twine holder releases the front recess of the front pair of recesses, and the front recess of the rear pair of recesses reaches the clamping position range, cutting through the second twine strand between the bill hook and the twine holding device by means of the twine knife and pulling out the first twine strand from the twine holding device by means of the twine knife.

* * * * *